(12) United States Patent
Tachibana et al.

(10) Patent No.: US 12,464,592 B2
(45) Date of Patent: Nov. 4, 2025

(54) MANAGING DEVICE, MANAGING METHOD, AND RECORDING MEDIUM ON WHICH MANAGING PROGRAM IS RECORDED

(71) Applicant: TOYOTA JIDOSHA KABUSHIKI KAISHA, Toyota (JP)

(72) Inventors: Katsuharu Tachibana, Nagoya (JP); Nana Kikuire, Shizuoka-ken (JP); Hiroshi Inoue, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 351 days.

(21) Appl. No.: 18/317,157

(22) Filed: May 15, 2023

(65) Prior Publication Data

US 2023/0413362 A1 Dec. 21, 2023

(30) Foreign Application Priority Data

Jun. 17, 2022 (JP) .................................. 2022-098456

(51) Int. Cl.
- *H04W 4/30* (2018.01)
- *B60W 50/10* (2012.01)
- *H04W 76/19* (2018.01)

(52) U.S. Cl.
CPC ............ *H04W 76/19* (2018.02); *B60W 50/10* (2013.01)

(58) Field of Classification Search
CPC .. B60W 50/10; G07C 9/00309; G06F 9/5027; H04L 63/06; H04L 63/062; H04L 63/10; H04L 67/025; H04W 4/14; H04W 4/44; H04W 12/04; H04W 12/08; H04W 76/19
See application file for complete search history.

(56) References Cited

U.S. PATENT DOCUMENTS

| | | | |
|---|---|---|---|
| 9,466,162 B2* | 10/2016 | Nakai | G07C 9/00309 |
| 10,589,719 B1* | 3/2020 | Sohn | B60R 25/241 |
| 11,034,330 B2* | 6/2021 | DeLong | B60R 25/24 |
| 11,949,779 B2* | 4/2024 | Lim | H04L 9/3213 |
| 2014/0232524 A1 | 8/2014 | Nakai et al. | |

(Continued)

FOREIGN PATENT DOCUMENTS

| | | | |
|---|---|---|---|
| JP | 2006274574 A | 10/2006 |
| JP | 2020-033707 A | 3/2020 |

(Continued)

OTHER PUBLICATIONS

English translation of JP20062745574A, Oct. 12, 2006, 12 pages.*

*Primary Examiner* — Frank Duong
(74) *Attorney, Agent, or Firm* — Dickinson Wright, PLLC (57) ABSTRACT

A managing device that is configured to: in response to receiving a changing operation of a terminal at which key operation of a vehicle is possible, display, on a display, a candidate for a terminal that can communicate with the vehicle and at which key operation of the vehicle is possible, and display the candidate on the display in a display form that makes the changing operation possible in a case in which a communication status with a server corresponding to the candidate is that communication is possible, and that makes the changing operation impossible in a case in which a communication status with a server corresponding to the candidate is that communication is poor.

6 Claims, 6 Drawing Sheets

(56) References Cited

U.S. PATENT DOCUMENTS

| | | | |
|---|---|---|---|
| 2017/0372540 A1 | 12/2017 | Shirai et al. | |
| 2018/0213405 A1* | 7/2018 | Jung | H04W 12/069 |
| 2021/0168602 A1* | 6/2021 | Kim | H04W 12/041 |
| 2022/0109662 A1* | 4/2022 | Jenkins | H04W 12/35 |
| 2025/0028858 A1* | 1/2025 | Qiao | H04L 67/12 |

FOREIGN PATENT DOCUMENTS

| | | |
|---|---|---|
| WO | 2013076760 A1 | 5/2013 |
| WO | 2016092911 A1 | 6/2016 |

\* cited by examiner

MANAGING DEVICE, MANAGING METHOD, AND RECORDING MEDIUM ON WHICH MANAGING PROGRAM IS RECORDED

CROSS-REFERENCE TO RELATED APPLICATION

This application is based on and claims priority under 35 USC 119 from Japanese Patent Application No. 2022-098456 filed on Jun. 17, 2022, the disclosure of which is incorporated by reference herein.

BACKGROUND

Technical Field

The present disclosure relates to a managing device, a managing method, and a recording medium on which a managing program is recorded.

Related Art

The use of automobiles as elements of transportation services is becoming popular, and it is anticipated that car sharing and other various services will increase and become even more widespread. Accompanying this trend, there is an increasing need for wireless digital key systems that make the transfer of physical keys unnecessary by using smartphones as keys of the automobiles.

Japanese Patent Application Laid-Open (JP-A) No. 2020-33707 for example is a technique relating to a wireless digital key system. JP-A No. 2020-33707 discloses an electronic key system for a vehicle that is provided with a portable device and an onboard device, and that carries out unlocking of the door locks of a vehicle and the like by establishing authentication of the portable device by the onboard device.

The CCC (Car Connectivity Consortium) has formulated standards relating to vehicle electronic key systems. Owner devices, which are devices used by owners of vehicles, are prescribed in the standards formulated by the CCC.

Here, a case can be supposed in which an owner device is changed due to the digital key being replaced by a new one being purchased, or the like. In such a case, for example, first, the processing of deleting the owner device that is currently registered is carried out, and then the processing of registering a candidate for the new owner device is carried out. However, in a situation in which the candidate for the new owner device cannot communicate with the server, the changing operation cannot be completed, and therefore, the convenience deteriorates.

SUMMARY

According to an aspect of the present disclosure, a managing device includes: a memory; and a processor connected to the memory, the processor being configured to: in response to receiving a changing operation of a terminal at which key operation of a vehicle is possible, display, on a display, a candidate for a terminal that can communicate with the vehicle and at which key operation of the vehicle is possible, and display the candidate on the display in a display form that makes the changing operation possible in a case in which a communication status with a server corresponding to the candidate is that communication is possible, and that makes the changing operation impossible in a case in which a communication status with a server corresponding to the candidate is that communication is poor.

DETAILED DESCRIPTION

An example of an embodiment of the present invention is described hereinafter with reference to the drawings. Note that, in the drawings, the same reference numerals are given to structural elements and portions that are the same or equivalent. Further, the dimensional proportions in the drawings are exaggerated for convenience of explanation, and there are cases in which they differ from actual proportions.

Figure 1:
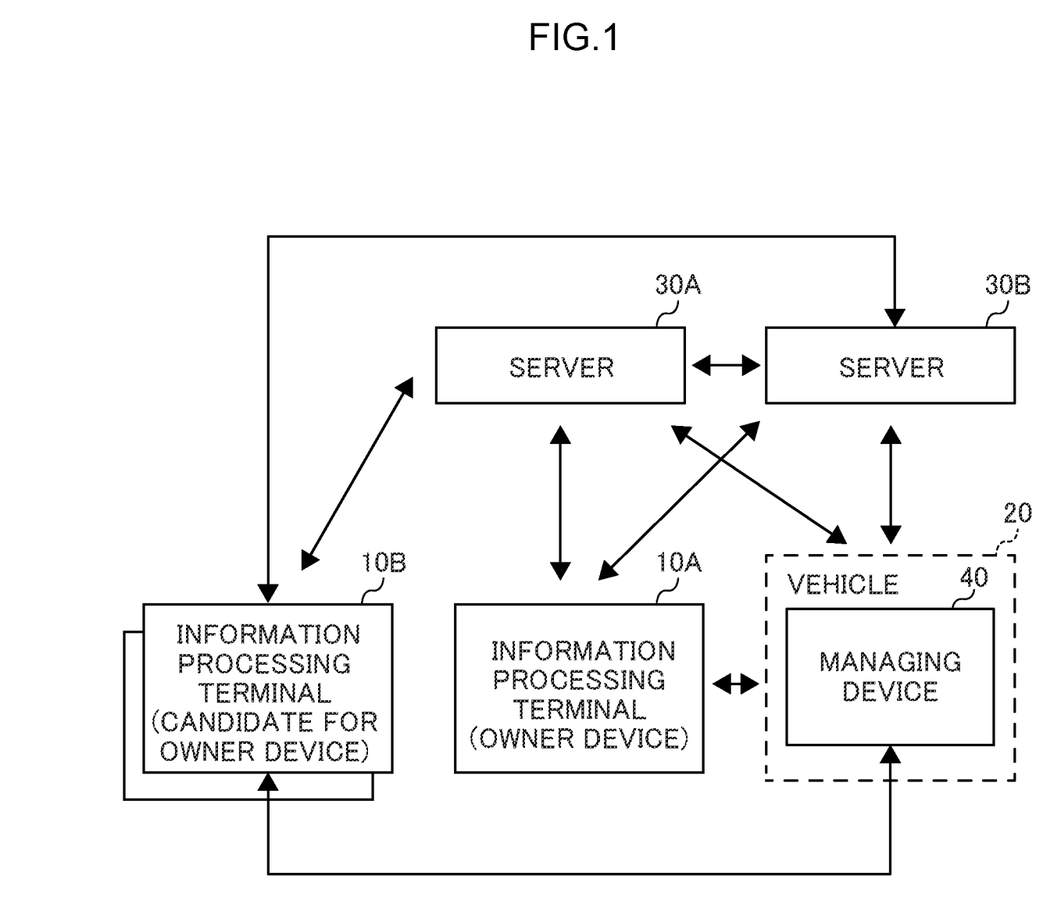
FIG. 1 is a drawing illustrating an example of the schematic structure of a digital key system of a vehicle relating to a present embodiment.

FIG. 1 is a drawing illustrating the schematic structure of a digital key system of a vehicle relating to the present embodiment. The digital key system illustrated in FIG. 1 includes an information processing terminal 10A, one or more information processing terminals 10B, a vehicle 20, and servers 30A, 30B. A managing device 40 is installed in the vehicle 20. Note that, although omitted for convenience of explanation, an information processing terminal that is a friend device, which is a device supposing usage by a friend or a family member of the owner of the vehicle 20, can be included as a structure in the digital key system.

The information processing terminal 10A is a terminal in which is stored a key (a digital key) for unlocking the locks of the vehicle 20 and making driving of the vehicle 20 possible, and is an owner device (owner terminal) in the "Digital Key" standards that are formulated by the CCC (and is simply called owner device hereinafter). The information processing terminal 10A can be a portable terminal such as, for example, a smartphone, a wearable device, or the like. The information processing terminal 10A communicates with the vehicle 20 by using near wireless communication technology such as BLE (Bluetooth® Low Energy), NFC (Near Field Communication), UWB (Ultra Wide Band), or the like. The information processing terminal 10A can carry out key operations of the vehicle 20 by such communication.

The information processing terminal 10B is a terminal that can be changed to the owner device, and is a terminal that is a candidate for the owner device. (Hereinafter, there are also cases in which the information processing terminal 10B is simply called a "candidate"). The information processing terminal 10B can be a portable terminal such as, for example, a smartphone, a wearable device, or the like.

The information processing terminals 10A, 10B can be used as a digital key of the vehicle 20 by, for example, downloading and installing an application for causing the terminal to function as a digital key of the vehicle 20, and sharing information relating to the digital key with the vehicle 20.

The vehicle 20 carries out near wireless communication by any of the above-described, various near wireless communication techniques with the information processing terminal 10A that functions as the digital key of the vehicle 20, and executes processings relating to a digital key. The vehicle 20 executes locking processing and unlocking processing of the doors of the vehicle 20 as processings relating to a digital key. Further, the vehicle 20 executes the processing of starting-up the engine or the motor on the basis of an engine or motor start-up request from the information processing terminal 10A that operates as the digital key of the vehicle 20.

Note that, when the vehicle 20 receives an engine start-up request from the information processing terminal 10A, the vehicle 20 judges whether or not the information processing terminal 10A exists within the cabin of the vehicle 20. The reason for judging whether or not the information processing terminal 10A exists within the cabin of the vehicle 20 is in order to prevent starting of the engine in a state in which the information processing terminal 10A is outside of the vehicle cabin. The vehicle 20 judges whether or not the information processing terminal 10A exists within the cabin of the vehicle 20 by referring to the strength of the radio waves that are emitted from the information processing terminal 10A and are received by an antenna provided within the vehicle cabin.

The server 30A is a server for providing, to the information processing terminal 10A, information for having the information processing terminal 10A function as a digital key of the vehicle 20. In response to a request from the information processing terminal 10A, the server 30A provides an application of a digital key, information relating to the digital key, and the like to the information processing terminal 10A as information for functioning as a digital key of the vehicle 20.

The server 30A can be provided, for example, for each manufacturer of the information processing terminal 10A. If the manufacturers of the information processing terminals 10A are the same, the information for functioning as a digital key may be provided from the same server.

The server 30B is a server that, in cooperation with the server 30A, provides the information processing terminal 10A and the vehicle 20 with information for having the information processing terminal 10A function as a digital key of the vehicle 20. The server 30B can be provided for each manufacturer of the vehicle 20. The server 30B provides the vehicle 20 with information relating to the digital key, and the like, as information for functioning as a digital key of the vehicle 20, in accordance with a request from the information processing terminal 10A or the vehicle 20, or even if there is no request from the information processing terminal 10A or the vehicle 20.

The managing device 40 receives a request for a changing operation from the owner. What is called a changing operation here is the operation of changing the owner device that is based on the "Digital Key" standards of the CCC. In accordance with such a request, the managing device 40 transmits a request to change the owner device to the server 30A, 30B. When the server 30A, 30B receives the change request, the server 30A, 30B communicates with the information processing terminals 10B that are candidates for the owner device. The managing device 40 displays the information processing terminals 10B that are candidates, in accordance with the statuses of communication between the information processing terminals 10B and the server 30A. The form of display is described later. The managing device 40 displays the information processing terminals 10B as candidates for the owner device, and receives the selection for the information processing terminal 10B that is to be changed to the owner device. The server 30B changes the selected information processing terminal 10B to the information processing terminal 10A that is the owner device.

Figure 2:
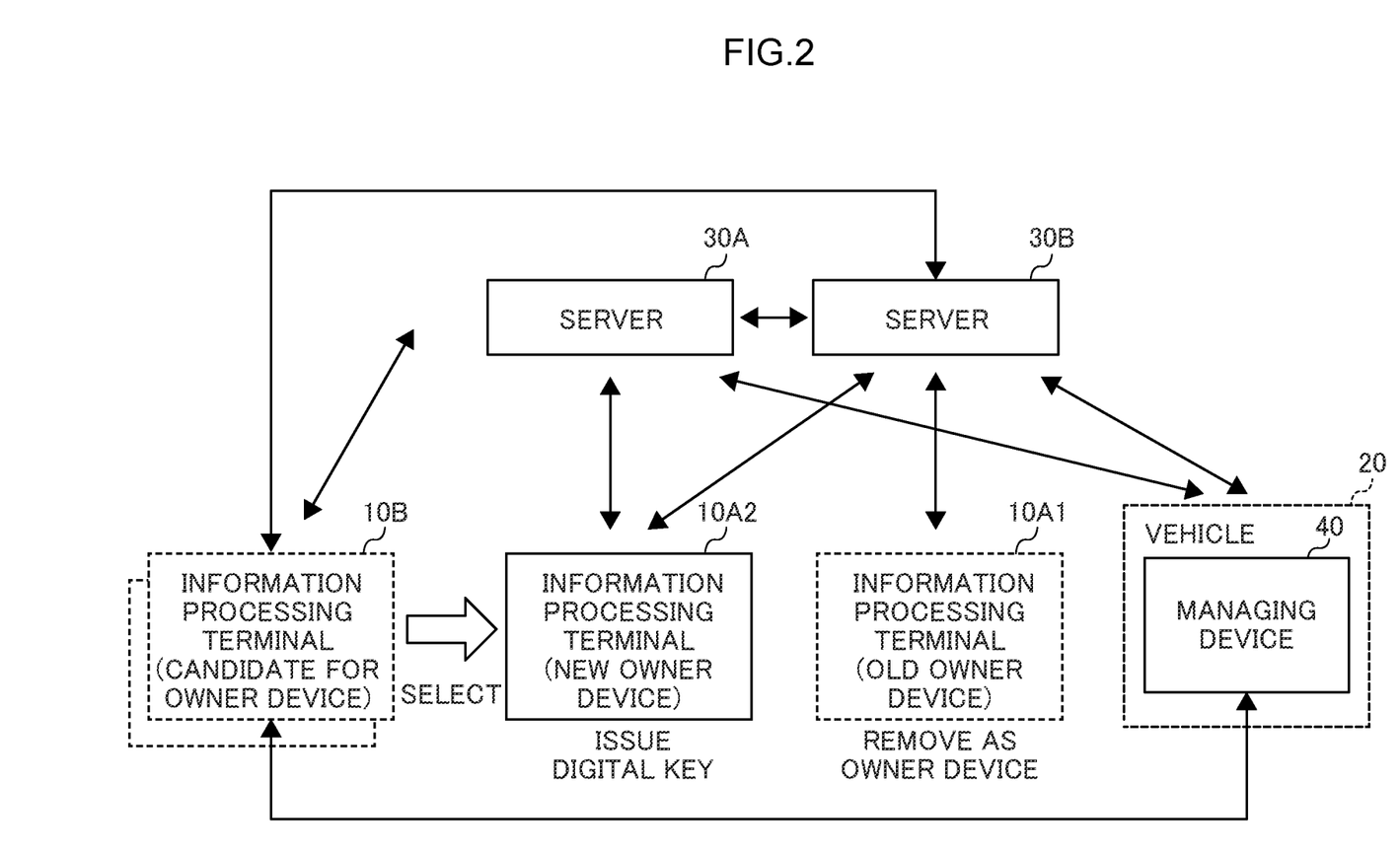
FIG. 2 is a drawing illustrating an example of a changing operation of an owner device in the digital key system.

FIG. 2 is a drawing illustrating an example of the operation of changing the owner device at the digital key system. The old information processing terminal that is the original owner device is information processing terminal 10A1, and the information processing terminal that is to become the new owner device is information processing terminal 10A2. The information processing terminal 10A2 is the terminal selected from the information processing terminals 10B. Due to the changing operation, the server 30B issues a digital key for making the information processing terminal 10A2 the new owner device, and transmits that digital key to the information processing terminal 10A2. The information processing terminal 10A2 receives the digital key, and, by carrying out the necessary authentication processing in the "Digital Key" standard of the CCC, becomes the owner device. Processing for removing the information processing terminal 10A1 as an owner device is carried out. In the processing for removal as an owner device, the server 30B (or the server 30A) transmits a deletion signal for the digital key to the information processing terminal 10A1. The information processing terminal 10A1 that receives the deletion signal deletes the digital key, and is no longer the owner device. The changing operation is thereby completed.

The managing device 40 is a device for managing the operation of changing the information processing terminal 10B to the owner device. Functional structures of the managing device 40 are described later.

Figure 3:
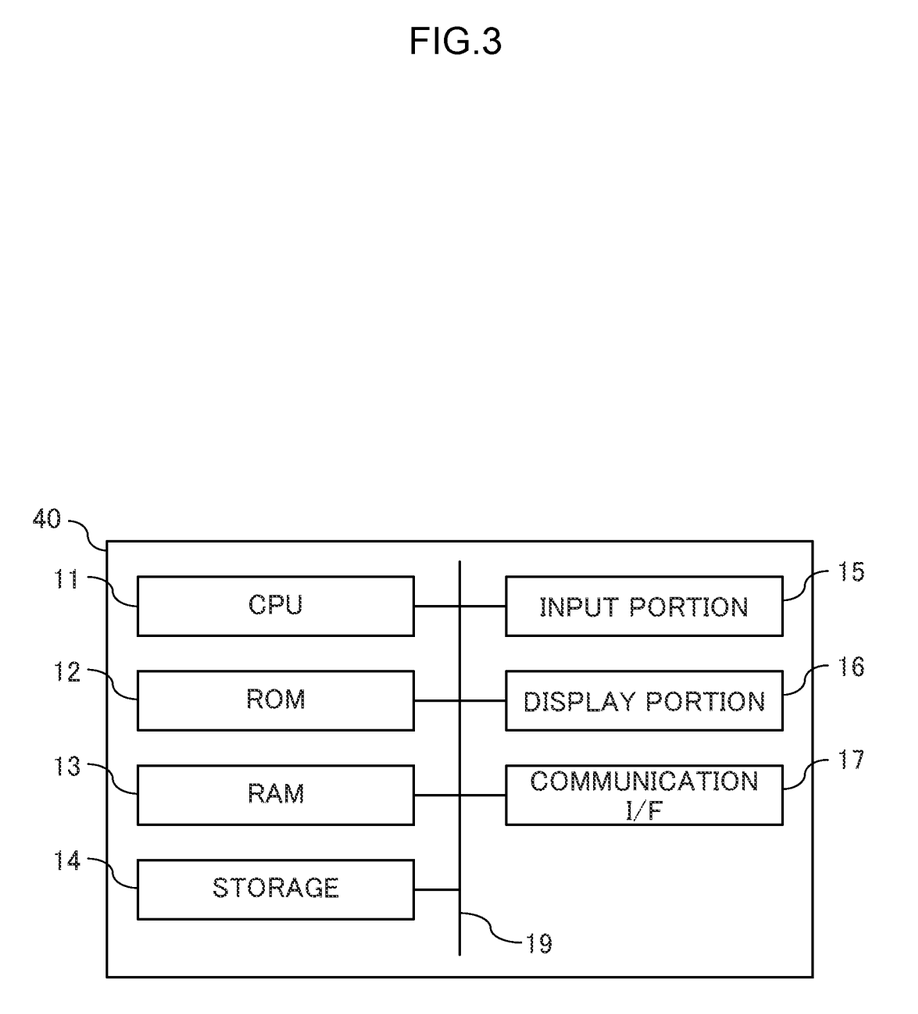
FIG. 3 is a block drawing illustrating an example of hardware structures of a managing device.

Hardware structures of the managing device 40 are described next. FIG. 3 is a block drawing illustrating the hardware structures of the managing device 40.

As illustrated in FIG. 3, the managing device 40 has a CPU (Central Processing Unit) 11 that is an example of a hardware processor, a ROM (Read Only Memory) 12 that is an example of a memory, a RAM (Random Access Memory) 13, a storage 14, an input portion 15, a display portion 16, and a communication interface (I/F) 17. These respective structures are connected so as to be able to communicate with one another via bus 19.

The CPU 11 is a central computing processing unit, and executes various programs and controls the respective sections. Namely, the CPU 11 loads a program from the ROM 12 or the storage 14, and executes the program by using the RAM 13 as a workspace. The CPU 11 carries out control of the above-described respective structures, and various computing processings, in accordance with programs recorded in the ROM 12 or the storage 14. In the present embodiment, a computer program that executes the managing processing is stored in the ROM 12 or the storage 14.

The ROM 12 stores various programs and various data. The RAM 13 temporarily stores programs and data as a workspace. The storage 14 that is a non-transitory recording medium is structured by a storage device such as an HDD (Hard Disk Drive), an SSD (Solid State Drive) a flash memory or the like, and stores various programs, including the operating system, and various data.

The input portion 15 includes a keyboard or buttons that are touch panel type or the like, and is used in order to carry out various types of input.

The display portion 16 is a liquid crystal display for example, and displays various information. By using a touch panel type display therefor, the display portion 16 can function as the input portion 15 as well.

The communication interface 17 is an interface for communication with other equipment such as the information processing terminal 10A, the server 30A, the server 30B and the like, and standards such as, for example, Ethernet®, FDDI, Wi-Fi®, BLE, NFC, UWB or the like are used therefor.

Note that the information processing terminals 10A, 10B can be made to have hardware structures that are similar to those of the managing device 40. A program relating to a digital key of the vehicle 20 is stored in the information processing terminal 10A that serves as the owner device.

At the time of executing the above-described computer program, the managing device 40 realizes various functions by using the above-described hardware resources. The functional structures realized by the managing device 40 are described.

Figure 4:
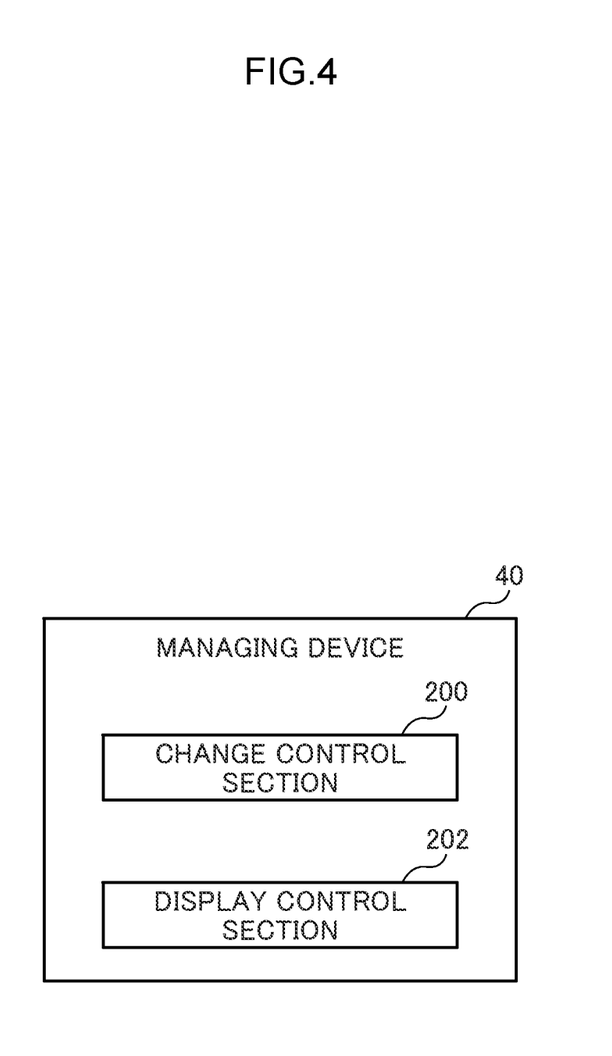
FIG. 4 is a block drawing illustrating an example of functional structures of the managing device.

FIG. 4 is a block drawing illustrating an example of the functional structures of the managing device 40. As illustrated in FIG. 4, the managing device 40 has a change control section 200 and a display control section 202 as the functional structures thereof. These respective functional structures are realized by the CPU 11 reading-out a computer program stored in the ROM 12 or the storage 14 and executing the program. Note that the function of the change control section 200 may be provided at the server 30A or the server 30B.

The change control section 200 receives a request for a changing operation of the owner device from the input portion 15, and transmits the change request to the server 30A, 30B. When the server 30A, 30B receives the change request, the server 30A, 30B communicates with the information processing terminals 10B that are candidates for the owner device.

Further, in a case in which the change control section 200 receives a changing operation at the time when a changing operation is possible for a candidate for the owner device, but, during the changing, that candidate becomes unable to communicate with the server, the change control section 200 pauses the changing operation. When that candidate again becomes able to communicate, the change control section 200 stops the pausing and restarts the changing operation.

The display control section 202 causes the display portion 16 to display the information processing terminals 10B that can communicate with the managing device 40 of the vehicle 20 and that are the candidates for the owner device. The display control section 202 displays the candidates in display forms that correspond to the statuses of communication between the information processing terminals 10B and the server 30A. The display control section 202 displays a candidate in a display form that is such that, in a case in which the communication status is that communication is possible, a changing operation is made possible, and, in a case in which communication is poor, a changing operation is made impossible. Note that an example of the server corresponding to the candidate is the server 30A. Further, the control of display by the display control section 202 is not limited to displaying on the display portion 16 of the managing device 40, and the display control section 202 may cause the candidates to be displayed on the display portion of a device other than the managing device 40.

Figure 5:
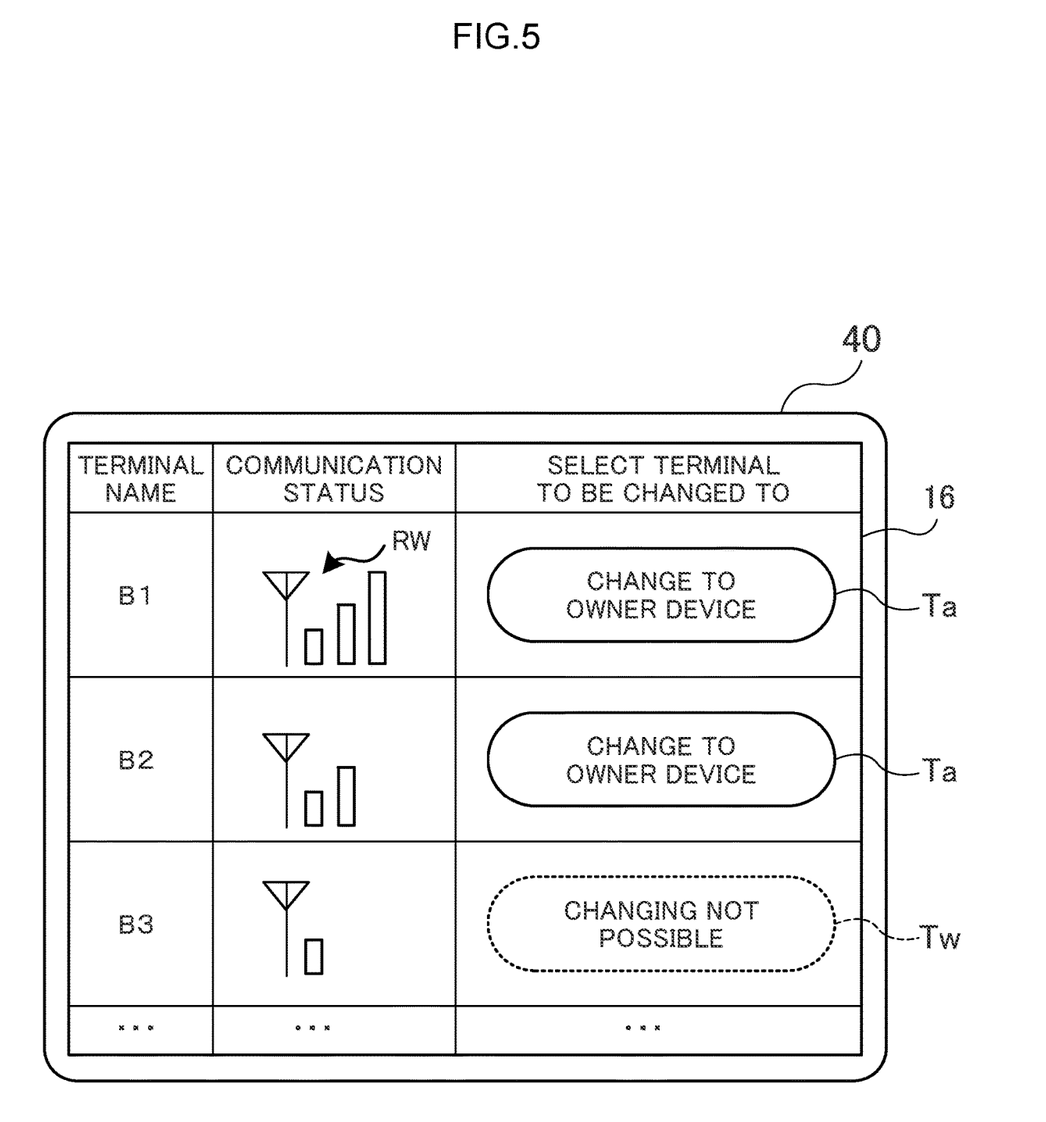
FIG. 5 is a drawing illustrating an example of a display form corresponding to communication status.

FIG. 5 is a drawing illustrating an example of a display form in accordance with communication status. In the example of FIG. 5, the information processing terminals 10B that can communicate with the managing device 40 of the vehicle 20 are information processing terminal 10B1 (B1), information processing terminal 10B2 (B2), and information processing terminal 10B3 (B3). B1 through B3 are the terminal names. The display control section 202 displays antenna bars showing the communication strength of each of the terminals, as identification information (RW) of the status of communication thereof with the server 30A. For example, it suffices to use the degree of the communication delay that is sensed at the server 30A as the communication strength. In this example, two or more antenna bars indicate that communication is possible, and one or fewer antenna bar indicates that communication is poor. Note that use of antenna bars as the identification information is an example, and an explanation of the communication status or another icon expressing the communication strength may be used. The communication status of B1 is three antenna bars, meaning that communication is possible. The communication status of B2 is two antenna bars, meaning that communication is possible. The communication status of B3 is one antenna, meaning that the communication status is that there is poor communication. In this case, because communication is possible at B1, B2, the display control section 202 displays buttons (Ta) of "change to owner device" that can be selected, and because communication at B3 is poor, a "changing not possible" icon (Tw) is displayed therefor.

Note that above-described form of display of FIG. 5 assumes a case in which the ignition of the vehicle 20 is off. In a case in which the ignition of the vehicle 20 is on, in the forms of displaying the information processing terminals 10B, the display control section 202 displays the changing operations of all of the candidates as impossible states, i.e., by the "changing not possible" icon (Tw). Note that it suffices to acquire the status of the ignition of the vehicle 20 from an ECU (Electronic Control Unit) (not illustrated) of the vehicle 20. Due thereto, the operation of changing the owner device in a state in which traveling of the vehicle 20 is possible can be suppressed.

Further, in a case in which the information processing terminal 10A that is the owner device before changing can communicate with the server 30A, the change control section 200 may provide notice of a request for a changing operation, and may receive the selection of the permission/denial of the changing operation. In the notifying of a request for a changing operation, notice is given to the information processing terminal 10A at the time when a "change to owner device" button (Ta) is selected or at the time when a request for a changing operation is transmitted. Content such as, for example, "Permit change of owner device?" is displayed on the information processing terminal 10A, and the information processing terminal 10A is urged to select "permit" or "deny". In a case in which the changing operation request is permitted, the change control section 200 makes a changing operation possible, and, in a case in which the changing operation request is denied, the change control section 200 does not permit a changing operation. In a case in which the changing operation request is denied, the display control section 202 displays "Change denied at current owner device." for example, and displays content to the effect that a changing operation will not be received.

(Flow of Control)

Figure 6:
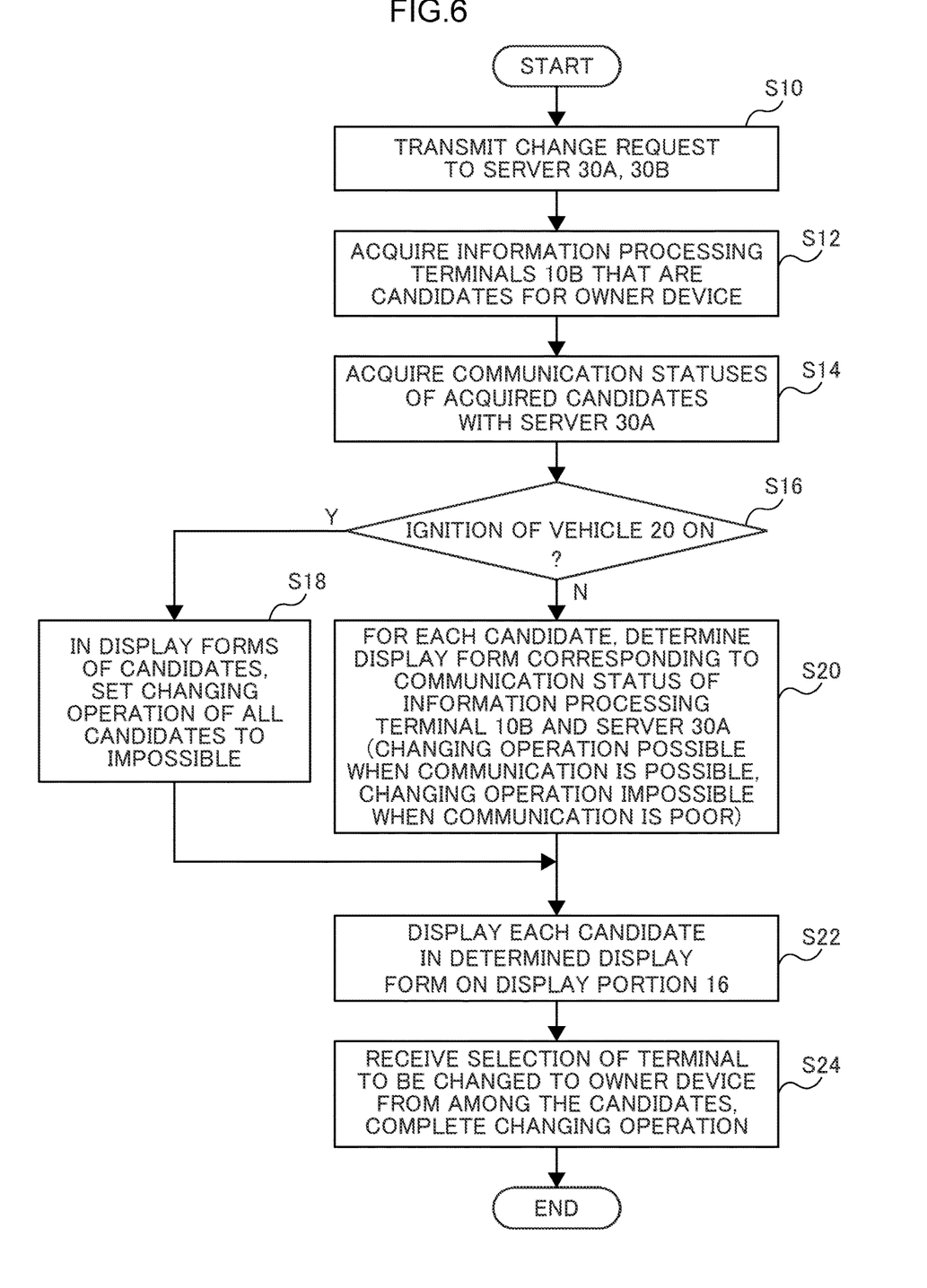
FIG. 6 is a flowchart illustrating an example of the flow of managing processing of the managing device.

The flow of the managing processing of the present embodiment is described by using the flowchart of FIG. 6. When the CPU 11 of the managing device 40 receives a request for a changing operation of the owner device from the input portion 15, the CPU 11 executes the following respective processings. This is the time of receiving an owner device changing operation. Note that, although a case is described in which the CPU 11 executes the respective processings, the present disclosure is not limited to this, and the following flowchart may be realized by one or more processors reading-in and executing programs that are stored in one or more memories.

In step S10, the CPU 11 transmits, to the server 30A, 30B, a request to change the owner device.

In step S12, the CPU 11 acquires the information processing terminals 10B that are candidates for the owner device (hereinafter called candidates). The candidates are terminals that can communicate with the managing device 40 that is installed in the vehicle 20.

In step S14, the CPU 11 acquires the statuses of communication with the server 30A of the acquired candidates.

In step S16, the CPU 11 judges whether or not the ignition of the vehicle 20 is on. If the ignition is on, the CPU 11 moves on to step S18. If the ignition is not on, the CPU 11 moves on to step S20. Note that the present step may be executed before step S12. In this case, if the ignition is on, the CPU 11 skips step S12 and step S14.

In step S18, for the display form of the candidates, the CPU 11 sets the changing operations of all of the candidates to impossible states.

In step S20, for each of the candidates, the CPU 11 determines a display form that corresponds to the communication status of that information processing terminal 10B with the server 30A. The display form of the candidate makes the changing operation possible in a case in which the communication status of the candidate is that communication is possible, and makes the changing operation impossible in a case in which the communication status of the candidate is that communication is poor.

In step S22, for each of the candidates, the CPU 11 displays the determined display form on the display portion 16.

In step S24, the CPU 11 receives the selection of the terminal that is to be changed to the owner device among the candidates, and completes the changing operation and ends the processing.

In accordance with the managing device 40 of the present embodiment, the possibility of there being a failure in changing after an operation to change the owner device can be reduced, and the convenience for the user can be improved.

Further, at the time when a changing operation for the owner device that is based on the "Digital Key" standards of the CCC (Car Connectivity Consortium) is received, the display control section 202 may display a candidate for the new owner device as a candidate. Due thereto, in a changing operation that is based on these standards, candidates can be displayed while taking the communication statuses thereof into consideration.

Further, in a case in which there are plural candidates for the device, the display control section 202 may display, in the display forms, the communication status with the server for each of the candidates. Due thereto, the user can understand the communication statuses, and the convenience for the user can be improved.

Further, in a case in which a changing operation is received at the time when a changing operation is possible at a candidate, but, in the midst of the changing, that candidate becomes unable to communicate with the server 30A, the change control section 200 may pause the changing operation, and, in a case in which communication becomes possible, the change control section 200 may stop the pausing and restart the changing operation. Due thereto, even in a case in which communication becomes poor in the midst of a changing operation, the changing operation can be restarted. Therefore, there is no need for the user to again request a changing operation from the beginning, and the convenience for the user can be improved.

Further, in a case in which the information processing terminal 10 that is the owner device before a change can communicate with the server 30A, the change control section 200 may give notice of a request for the changing operation, and receive the selection of the permission/denial of the changing operation. Due thereto, the changing operation can be carried out upon obtaining permission of the current owner device, and therefore, the owner device being changed erroneously can be suppressed.

Note that any of various types of processors other than a CPU may execute the managing processing that is executed due to the CPU reading-in software (a program) in the above-described embodiment. Examples of processors in this case include PLDs (Programmable Logic Devices) whose circuit structure can be changed after production such as FPGAs (Field-Programmable Gate Arrays) and the like, and dedicated electrical circuits that are processors having circuit structures that are designed for the sole purpose of executing specific processings such as ASICs (Application Specific Integrated Circuits) and the like, and the like. Further, the managing processing may be executed by one of these various types of processors, or may be executed by a combination of two or more of the same type or different types of processors (e.g., plural FPGAs, or a combination of a CPU and an FPGA, or the like). Further, the hardware structures of these various types of processors are, more specifically, electrical circuits that combine circuit elements such as semiconductor elements and the like.

Further, the above embodiment describes a form in which the program of the managing processing is stored in advance (is installed) in the ROM or the storage, but the present disclosure is not limited to this. The program may be provided in the form of being recorded on a non-transitory recording medium such as a CD-ROM (Compact Disk Read Only Memory), a DVD-ROM (Digital Versatile Disk Read Only Memory), a USB (Universal Serial Bus) memory, or the like. Further, the program may be in the form of being downloaded from an external device over a network.

The present disclosure can reduce the possibility of a failure in changing after an operation to change a device at which key operation is possible, and can improve the convenience for the user.

According to an aspect of the present disclosure, a managing device includes: a memory; and a processor connected to the memory, the processor being configured to: in response to receiving a changing operation of a terminal at which key operation of a vehicle is possible, display, on a display, a candidate for a terminal that can communicate with the vehicle and at which key operation of the vehicle is possible, and display the candidate on the display in a display form that makes the changing operation possible in a case in which a communication status with a server corresponding to the candidate is that communication is possible, and that makes the changing operation impossible in a case in which a communication status with a server corresponding to the candidate is that communication is poor.

In accordance with the aspect, there is a display form in which, if there is a situation in which communication is possible with the server that corresponds to a candidate for the terminal, the changing operation is made possible, and if there is a situation in which communication cannot be carried out, the changing operation is made impossible. Due thereto, the possibility of a failure in changing after the changing operation of a terminal at which key operation is possible can be reduced, and the convenience for the user can be improved.

In accordance with the present disclosure, the possibility of a failure in changing after the operation of changing a terminal at which key operation is possible can be reduced, and the convenience for the user can be improved.

What is claimed is:

1. A managing device comprising:
   a memory; and
   a processor connected to the memory, the processor being configured to:
   in response to receiving a changing operation of a terminal at which key operation of a vehicle is possible, display, on a display, a candidate for a terminal that can communicate with the vehicle and at which key operation of the vehicle is possible, and
   display the candidate on the display in a display form that makes the changing operation possible in a case in which a communication status with a server corresponding to the candidate is that communication is possible, and that makes the changing operation impossible in a case in which a communication status with a server corresponding to the candidate is that communication is poor; wherein the processor is configured to, in a case in which there are a plurality of candidates for the terminal, display a communication status with a server for each of the candidates in the display form; and
   in a case in which an ignition of the vehicle is on, display changing operations of all candidates as impossible in the display form.

2. The managing device of claim 1, wherein the processor is configured to, in response to receiving a changing operation of an owner terminal that is based on CCC (Car Connectivity Consortium) standards, display a candidate of a new owner terminal as the candidate.

3. The managing device of claim 1, wherein the processor is configured to:
   in a case in which the changing operation is possible at a particular candidate, receive the changing operation,
   in a case in which, in a midst of changing, the particular candidate becomes unable to communicate with a server, pause the changing operation, and
   in a case in which communication becomes possible, stop the pausing and restart the changing operation.

4. The managing device of claim 1, wherein the processor is configured to, in a case in which the terminal before a change can communicate with a server, give notice of a request for the changing operation, and accept a selection of permission/denial of the changing operation.

5. A managing method comprising:
   by a processor,
   in response to receiving a changing operation of a terminal at which key operation of a vehicle is possible, displaying, on a display, a candidate for a terminal that can communicate with the vehicle and at which key operation of the vehicle is possible,
   displaying the candidate on the display in a display form that makes the changing operation possible in a case in which a communication status with a server corresponding to the candidate is that communication is possible, and that makes the changing operation impossible in a case in which a communication status with a server corresponding to the candidate is that communication is poor;
   in a case in which there are a plurality of candidates for the terminal, displaying a communication status with a server for each of the candidates in the display form; and
   in a case in which an ignition of the vehicle is on, displaying changing operations of all candidates as impossible in the display form.

6. A non-transitory, computer-readable recording medium storing a managing program executable by a computer to perform processing, wherein the processing comprises:
   in response to receiving a changing operation of a terminal at which key operation of a vehicle is possible, displaying, on a display, a candidate for a terminal that can communicate with the vehicle and at which key operation of the vehicle is possible,
   displaying the candidate on the display in a display form that makes the changing operation possible in a case in which a communication status with a server corresponding to the candidate is that communication is possible, and that makes the changing operation impossible in a case in which a communication status with a server corresponding to the candidate is that communication is poor;
   in a case in which there are a plurality of candidates for the terminal, displaying a communication status with a server for each of the candidates in the display form; and
   in a case in which an ignition of the vehicle is on, displaying changing operations of all candidates as impossible in the display form.

* * * * *